US008723849B2

(12) United States Patent
Iwasa

(10) Patent No.: US 8,723,849 B2
(45) Date of Patent: May 13, 2014

(54) LIQUID CRYSTAL DISPLAY DEVICE

(75) Inventor: Takayuki Iwasa, Yokohama (JP)

(73) Assignee: JVC Kenwood Corporation, Yokohama-Shi, Kanagawa (JP)

( * ) Notice: Subject to any disclaimer, the term of this patent is extended or adjusted under 35 U.S.C. 154(b) by 182 days.

(21) Appl. No.: 13/365,648

(22) Filed: Feb. 3, 2012

(65) Prior Publication Data

US 2012/0200548 A1 Aug. 9, 2012

(30) Foreign Application Priority Data

Feb. 4, 2011 (JP) ................................ P2011-022570

(51) Int. Cl.
*G06F 3/038* (2013.01)
*G09G 5/00* (2006.01)

(52) U.S. Cl.
USPC ............................ 345/208; 257/213; 257/413

(58) Field of Classification Search
USPC ........................... 257/213–413; 345/204, 208
See application file for complete search history.

(56) References Cited

U.S. PATENT DOCUMENTS 6,127,700 A * 10/2000 Bulucea ........................ 257/335
2009/0219238 A1* 9/2009 Furuya et al. ................... 345/87

FOREIGN PATENT DOCUMENTS

JP 2009-223289 A 10/2009

* cited by examiner

*Primary Examiner* — Michael Pervan
*Assistant Examiner* — Andrew Lee
(74) *Attorney, Agent, or Firm* — Nath, Goldberg & Meyer; Jerald L. Meyer; Scott C. Langford

(57) ABSTRACT

Since a first and a second source-follower PMOS transistor in a pixel have gates connected to a first and a second capacitor and are used always in on state, respectively, only respective threshold voltages in the first and second source-follower PMOS transistors are set to be +0.5 V and put in normally-on state. A current value in each of the first and second source-follower PMOS transistors is controlled by a constant current load transistor, and on/off thereof is controlled by the constant current load transistor and each of first and second switching NMOS transistors. Further, each of the first and second switching NMOS transistors intermediates to limit an outputtable voltage range and thereby optimization is performed so as to maximize a range where linearity is secured by shifting the respective threshold voltages of the first and second source-follower PMOS transistors.

6 Claims, 9 Drawing Sheets

LIQUID CRYSTAL DISPLAY DEVICE

CROSS REFERENCE TO RELATED APPLICATION

This application claims benefit of priority under 35 U.S.C. §119 to Japanese Patent Application No. 2011-022570, filed on Feb. 4, 2011, the entire contents of which are incorporated by reference herein.

BACKGROUND OF THE INVENTION

1. Field of the Invention

The present invention relates to a liquid crystal display device, and specifically relates to a liquid crystal display device which samples and holds a positive video signal and a negative video signal separately in two hold capacitors in each pixel and then carries out AC drive of a liquid crystal display element by applying held voltages thereof alternately to a pixel electrode.

2. Description of the Related Art

In recent years, an LCOS (Liquid Crystal on Silicon) type liquid crystal display device has been used frequently for a projector apparatus and a projection TV as a central component for projecting an image. As this LCOS type liquid crystal display device, the present applicant previously proposed a liquid crystal display device which arranges pixels in a matrix at respective intersection parts of a plurality of sets of data lines (column signal lines), each set including two data lines, and a plurality of gate lines (row scan lines), samples and holds a positive video signal and a negative video signal separately in two hold capacitors in each of the pixels, and then carries out AC drive of a liquid crystal display element by applying held voltages thereof alternately to a pixel electrode (refer to Patent document 1 (Japanese Patent Laid-Open No. 2009-223289), for example).

FIG. 1 shows an example of an equivalent circuit diagram for a pixel of this liquid crystal display device. In FIG. 1, a pixel comprises pixel selection transistors Tr1 and Tr2 for writing a positive video signal and a negative video signal, respectively, two independent hold capacitors Cs1 and Cs2 holding video signal voltages of both polarities in parallel, respectively, transistors Tr3 to Tr7 and a liquid crystal display element LC. The liquid crystal display element LC has a well-known structure in which a liquid crystal layer (display medium) LCM is sandwiched between a pixel electrode PE and a common electrode CE which are disposed so as to face each other, Further, the pixel selection transistors Tr1 and Tr2 and the switching transistors Tr5 and Tr6 are N-channel MOS field effect transistors (hereinafter called NMOS transistors), and the transistors Tr3, Tr4 and Tr7 are P-channel MOS field effect transistors (hereinafter called PMOS transistors). The transistors Tr3 and Tr7 and the transistors Tr4 and Tr7 are so-called source-follower buffers, respectively, and the transistors Tr3 and Tr4 are source-follower transistors and the transistor Tr7 is a transistor functioning as a constant current source load. The source-follower buffer of the MOS transistor has an almost infinitely large input resistance, and accumulated charge in each of the hold capacitors Cs1 and Cs2 is not leaked but held until the signal is newly written after one vertical scan period.

Further, a pixel part data line is configured with a set of two data lines, a positive data line Di+ and a negative data line Di−, for each pixel, and supplies video signals which are sampled by a data line drive circuit (not shown in the drawing) and have polarities different from each other. Drain terminals of the pixel selection transistors Tr1 and Tr2 are connected to the positive data line Di+ and the negative data line Di−, respectively, and respective gate terminals thereof for the same row are connected to a row scan line (gate line) Gj. Further, the constant current load transistors Tr7 are configured such that respective gates thereof in the same row pixels are connected to a common wiring B in the row direction and bias control of the constant current load is possible. Further, wirings S+ and S− are wirings for gate control signals and connected separately to gates of the transistors Tr5 and Tr6, respectively. Moreover, the row scan line Gj is connected commonly to the transistors Tr1 and Tr2 in the plurality of pixels in the same row.

Next, outline of AC drive control for this pixel will be explained with reference to a timing chart of FIG. 2. FIG. 2(A) shows a vertical synchronization signal VD which is a reference for vertical scan of a video signal, and FIG. 2(B) shows a load characteristic control signal of the wiring B which is applied to the gate of the transistor Tr7 in the pixel of FIG. 1. Further, FIG. 2(C) and FIG. 2(D) show signal waveforms of a gate control signal of the wiring S+ which is applied to the gate of the switching transistor Tr5 for transferring a positive side drive voltage in the above pixel and a gate control signal of the wiring S− which is applied to the gate of the switching transistor Tr6 for transferring a negative side drive voltage in the above pixel, respectively.

In FIG. 1, the positive side switching transistor Tr5 is turned on during a period when the gate control signal of the wiring S+ shown in FIG. 2(C) exhibits a high level, and when the load characteristic control signal supplied to the wiring B during this period is caused to exhibit a low level as shown in FIG. 2(B), the source-follower buffer becomes active and a pixel electrode PE node is charged to have a positive video signal level. When the potential of the pixel electrode PE has a potential of a fully charged state, the load characteristic control signal of the wiring B is caused to have a high level and also the gate control signal of the wiring S+ is switched to exhibit a low level at this timing, and then the pixel electrode PE comes to have a floating state and a positive drive voltage is held in liquid crystal capacitance.

On the other hand, the negative side switching transistor TR6 is turned on during a period when the gate control signal of the wiring S− shown in FIG. 2(D) exhibits a high level, when the load characteristic control signal supplied to the wiring B is caused to exhibit a low level during this period as shown in FIG. 2(B), the source-follower buffer becomes active and the pixel electrode PE node is charged to have a negative video signal level. When the pixel electrode PE is charged to have a fully charged state, the load characteristic control signal of the wiring B is caused to have a high level and also the gate control signal of the wiring S− is switched to exhibit a low level at this timing, and then the pixel electrode PE comes to have a floating state and a negative drive voltage is held in the liquid crystal capacitance.

Next, in synchronization with the alternative switching of the above switching transistors Tr5 and Tr6, the transistor Tr7 is caused to be active intermittently by the load characteristic control signal of the wiring B, and, by the repetition of the above actions, a drive voltage VPE, which is caused to change alternately by the positive and negative video signals, is applied to the pixel electrode PE of the liquid crystal display element LC as shown in FIG. 2(E). The pixel shown in FIG. 1 is configured not to transfer a held charge directly to the pixel electrode PE but to supply a voltage via the source-follower buffer, and thereby, even when charge and discharge is performed repeatedly between the negative and positive polarities, there is not a problem of charge neutralization and it is possible to realize a drive without voltage level attenuation.

Further, Vcom shown in FIG. 2(F) shows a voltage to be applied to a common electrode CE formed on an opposite substrate of the liquid crystal display device. A substantial AC drive voltage applied to the liquid crystal layer LCM is a differential voltage between the voltage Vcom applied to this common electrode CE and the voltage applied to the pixel electrode PE. As shown in FIG. 2(F), the voltage Vcom applied to the common electrode CE is inverted against a reference level which is approximately equal to an inversion reference level Vc of the pixel electrode potential in synchronization with the switching of the pixel polarity.

Further, the positive and negative video signal voltages sampled and held in the hold capacitors Cs1 and Cs2 are read out via the source-follower transistors Tr3 and Tr4 each having a high input resistance, respectively, and, as shown in FIGS. 2(C) and 2(D), selected alternately by the switching transistors Tr5 and Tr6 which are turned on by the gate control signal supplied alternately to the wirings S+ and S−, respectively, and then applied to the pixel electrode PE as the drive voltage VPE shown in FIG. 2(E) which is inverted between a positive polarity and a negative polarity. In this pixel shown in FIG. 1, the positive and negative video signal voltages are written in the hold capacitors Cs1 and Cs2, respectively, once in one vertical scan period (one frame), and then the video signal voltages can be read out from the respective hold capacitors Cs1 and Cs2 infinitely often during the one frame period until the video signal voltages of the next frame are held, and the liquid crystal display element LC can be driven in an AC mode by the alternate switching of the transistors Tr5 and Tr6. Accordingly, in the pixel shown in FIG. 1, the liquid crystal display element LC can be driven in the AC mode at a high frequency without a restriction in a vertical scan frequency independently from a write cycle of the video signal.

This AC drive frequency does not depend on the vertical scan frequency and can be set freely according to an inversion control period in a pixel circuit. For example, the vertical scan frequency is assumed to be 60 Hz which is used for a typical TV video signal and a frame is assumed to be configured with vertical period scan lines of 1,125 lines for the full High Vision. When the polarity switching of the pixel circuit is performed in cycles of approximately 15 lines, the AC drive frequency of the liquid crystal display element becomes 2.25 kHz (=60 (Hz)×1,125÷(15×2)) and the liquid crystal drive frequency can be significantly increased compared with a conventional liquid crystal display device. Accordingly, it is possible to prevent image sticking compared with a case in which the liquid crystal display element has a low AC drive frequency, and it becomes possible to significantly improve reliability and safety, display quality degradation such as a smear.

Note that the constant current load transistor Tr7 of the source-follower buffer is not always caused to be active in consideration of current consumption in the liquid crystal display device and controlled so as to be active only a limited period within the conduction period of the switching transistor Tr5 of Tr6. For example, even when constant source-follower circuit current is a small current of 1 μA for one pixel circuit, there is a problem that the current causes a large current consumption in a condition in which all the pixels of the liquid crystal display device consume the current constantly, and the current consumption is estimated to reach even 2 A in a liquid crystal display device having 2 million pixels for the full High Vision, for example.

Accordingly, in the pixel shown in FIG. 1, the low level period of the load characteristic control signal B which provides a gate bias for the constant current load transistor Tr7 is limited only to a transition period of the pixel voltage polarity switching period, and the load characteristic control signal B is caused to exhibit the high level immediately after the pixel electrode voltage VPE has been charged or discharged to a target level, to terminate the current of the source-follower buffer. Accordingly, despite the configuration of providing the buffers for all the pixels, it is possible to suppress substantial current consumption to a small value.

In the above conventional liquid crystal display device, as shown in FIG. 1, Tr1, Tr2, Tr5, and Tr6 are NMOS transistors and Tr3, Tr4, and Tr7 are PMOS transistors. Accordingly, the source-follower circuit using the PMOS transistors Tr3 and Tr4 is an amplifier having a gain of 0.87 and cannot be used for a high input voltage at which the output voltage to input voltage characteristic becomes nonlinear.

Further, in the above conventional liquid crystal display device, when a power supply voltage VDD is set to 5.5 V, as shown by the reference numeral IV in FIG. 8, a data line D+ and D− input voltage range of 0 V to 4.0 V is a linear range for outputting a voltage from 1.9 V to 4.8 V to the pixel electrode PE, but the output voltage curve starts to bend at an input voltage of 4.4 V. Since the linear range needs to be used for a dynamic range of the voltage to be applied to the liquid crystal display element LC, the dynamic range width of each pixel in the conventional liquid crystal display device becomes 2.9 V, that is, from 1.9 V to 4.8 V, for an input voltage of 0 V to 4.0 V. On the other hand, a voltage range to be applied to the liquid crystal display element LC needs to be approximately 3.8 V, and a narrower applied voltage range of the liquid crystal display element LC invites degradation of contrast and brightness. Accordingly, the conventional liquid crystal display device has a problem that the linear range of the source-follower output should be expanded.

SUMMARY OF THE INVENTION

The present invention has been achieved in view of the above point and aims at providing a liquid crystal display device in which the linear range of the source-follower output can be expanded from the conventional one.

For achieving the above purpose, a liquid crystal display device of the present invention comprises a plurality of pixels provided at intersection parts where a plurality of sets of data lines each set including two data lines and a plurality of row scan lines intersect each other, each of the pixels, including: a display element in which a liquid crystal layer is sandwiched between a pixel electrode and a common electrode facing each other; a first sampling and holding part sampling a positive video signal supplied via one of the two data lines in one set using a first pixel selection transistor to hold the sampled signal in a first hold capacitor for a certain period of time; a second sampling and holding part sampling a negative video signal which has a polarity opposite to that of the positive video signal and is supplied via the other of the two data lines in one set using a second pixel selection transistor to hold the sampled signal in a second hold capacitor for a certain period of time; a first source-follower transistor having a gate connected to the first hold capacitor; a second source-follower transistor having a gate connected to the second hold capacitor; a first and a second switching transistor which switch a positive hold voltage output of the first hold capacitor to be output through a source of the first source-follower transistor and a negative hold voltage of the second hold capacitor to be output through a source of the second source-follower transistor in a period shorter than a vertical scan period and apply the output voltages alternately to the pixel electrode, and also output voltage ranges of which are set so as to include linear ranges of input-output characteristics in the first and second source-follower transistors, respectively; and a constant current load transistor supplying a constant current to the first and second source-follower transistors through the first and second switching transistors, respectively, wherein respective threshold voltages of the first and second source-follower transistors are set by ion implantation so as to be different from a threshold voltage of the constant current load transistor.

DESCRIPTION OF THE EMBODIMENTS

Hereinafter, each embodiment of the present invention will be explained with reference to the drawings.

First Embodiment

Figure 1:
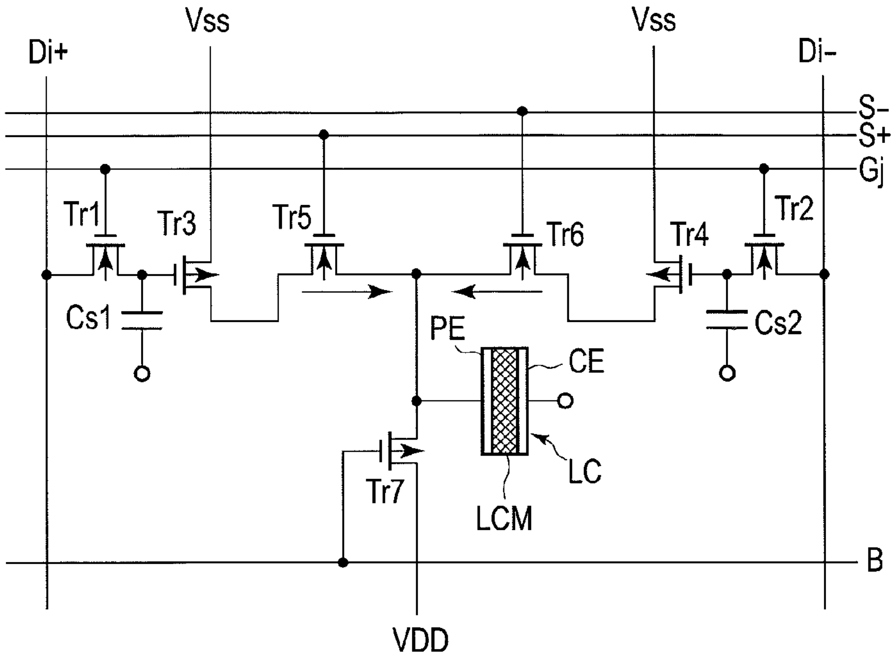
FIG. 1 PRIOR ART
FIG. 1 is an equivalent circuit diagram example of a pixel in a liquid crystal display device disclosed previously by the present applicant.
Figure 3:
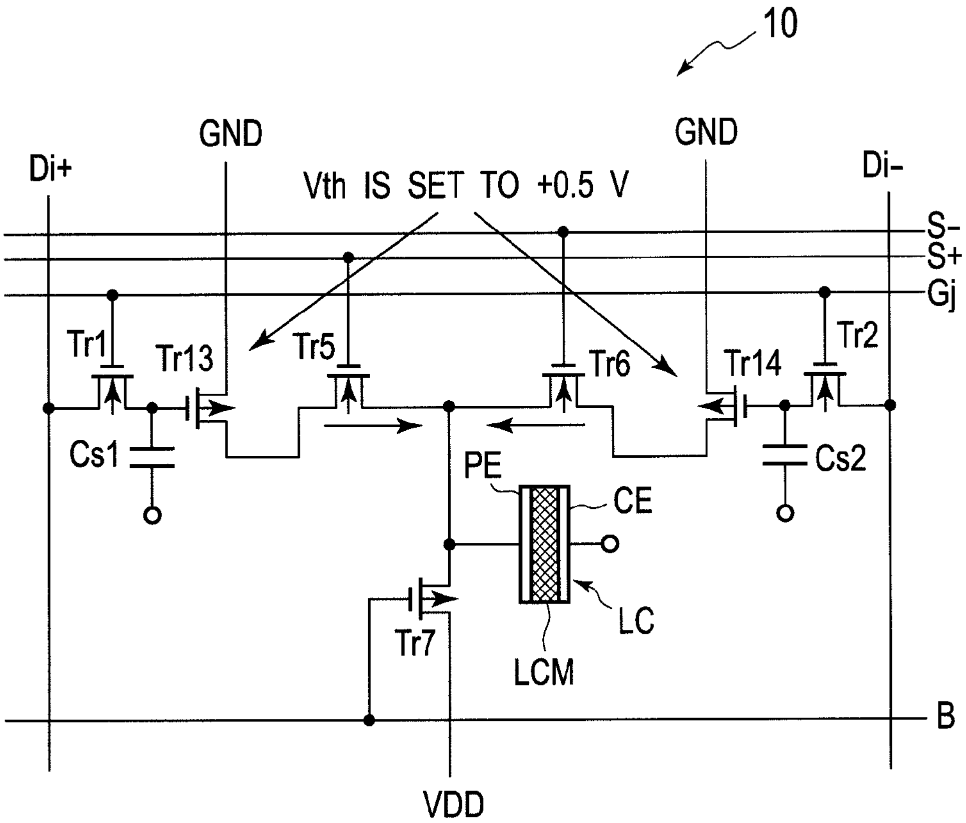
FIG. 3 is an equivalent circuit diagram of a pixel in a liquid crystal display device according to a first embodiment of the present invention.

FIG. 3 shows an equivalent circuit diagram of a pixel in a liquid crystal display device according to a first embodiment of the present invention. In FIG. 3, the same constituent part as that in FIG. 1 is provided with the same reference numeral. While the liquid crystal display device of the present embodiment is a liquid crystal display device in which, the same as the liquid crystal display device described in Patent document 1, pixels are arranged in a matrix at respective intersection parts of a plurality of sets of data lines, each set including two data lines (column signal lines) and a plurality of gate lines (row scan lines), a positive video signal and a negative video signal are sampled and held separately in two hold capacitors in each of the pixels, and then held voltages are applied to a pixel electrode alternately to drive a liquid crystal display element in an AC mode, the liquid display device has a pixel configuration different from that of the liquid crystal display device described in Patent document 1 and is configured to have a pixel configuration expressed by the equivalent circuit shown in FIG. 3.

That is, the pixel 10 shown in FIG. 3 is a pixel of the j-th line and the i-th column and is provided at an intersection part of the i-th set of two data lines (column signal line) Di+ and Di− and the j-th gate line (row scan line) Gj, and source-follower PMOS transistors Tr13 and Tr14 which are set in normally-on state are used replacing the source-follower PMOS transistors Tr3 and Tr4 shown in FIG. 1.

In FIG. 3, pixel selection NMOS transistors Tr1 and Tr2 have drain terminals connected to the positive data line Di+ and the negative data line Di−, respectively, and gate terminals thereof connected to a row scan line (gate line) Gj for the same row. Further, the NMOS transistors Tr1 and Tr2 have source terminals connected to connection points where one end of a positive hold capacitor Cs1 and one end of a negative hold capacitor Cs2 are connected to the gate terminals of the source-follower PMOS transistors Tr13 and Tr14, respectively.

Source terminals of the source-follower PMOS transistors Tr13 and Tr14 are connected to connection points with drain terminals of switching NMOS transistors Tr5 and Tr6, respectively. A PMOS transistor Tr7 is a constant current load transistor of a source-follower buffer which is configured with the PMOS transistor Tr7 and each of the source-follower PMOS transistors Tr13 or Tr14 and a potential VDD is applied to a source terminal thereof.

Source terminals of the switching NMOS transistors Tr5 and Tr6 are commonly connected to a pixel electrode PE of a liquid crystal display element LC. Further, a positive gate control signal line S+ is connected to a gate terminal of the switching NMOS transistor Tr5 and a negative gate control signal line S− is connected to a gate terminal of the switching NMOS transistor Tr6.

Figure 2:
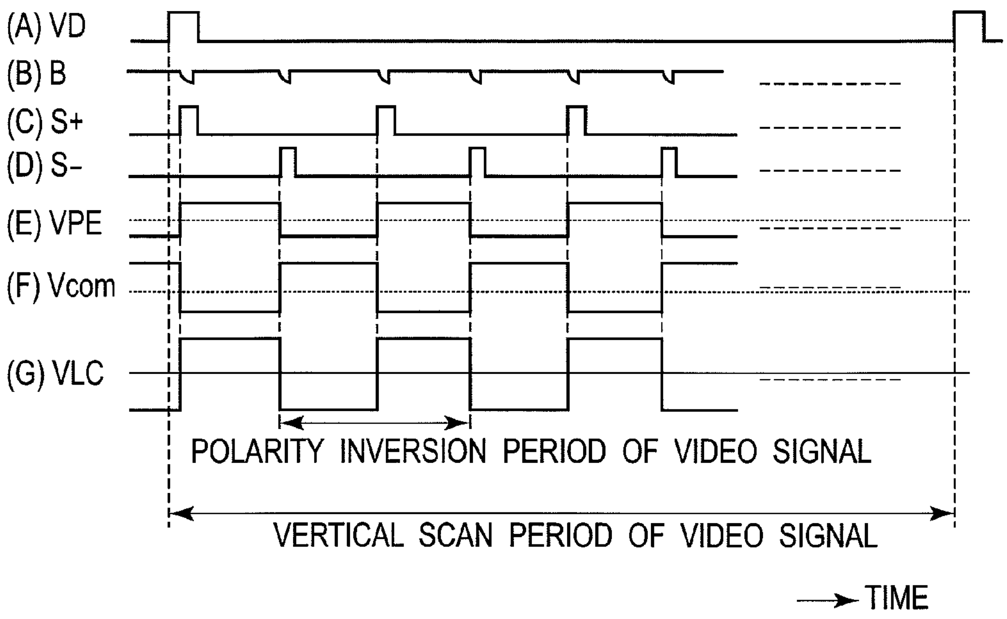
FIG. 2 PRIOR ART
FIG. 2 is a timing chart for explaining operation in FIG. 1.

Basic operation itself of the pixel 10 in the present embodiment is the same as the operation of the pixel in the conventional liquid crystal display device which was explained with reference to the timing chart shown in FIG. 2. That is, when a row selection signal supplied to the pixel 10 via the row scan line Gj in cycles of one vertical scan period exhibits a high level for a predetermined period, the NMOS transistors Tr1 and Tr2 are turned on at the same time for the predetermined period and a positive video signal input via the positive data line Di+ is sampled by the NMOS transistor Tr1 and held in the hold capacitor Cs1. In parallel to this operation, a negative video signal which has the same video information as the above positive video signal but has the opposite polarity is input via the negative data line Di− and sampled by the NMOS transistor Tr2 and held in the hold capacitor Cs2.

Figure 4:
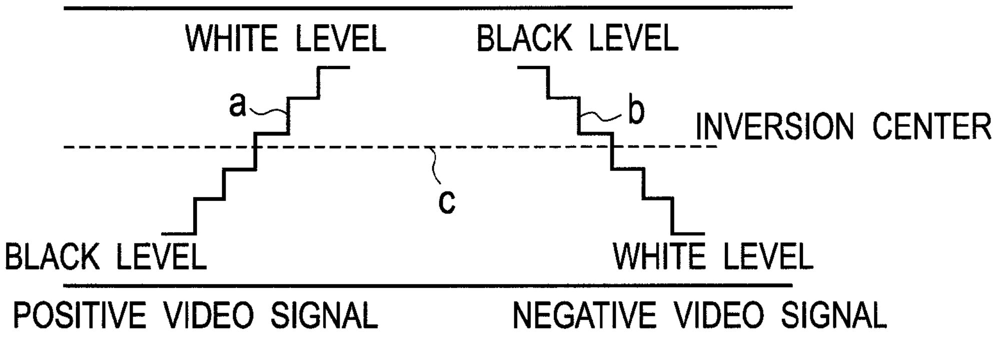
FIG. 4 is a diagram for explaining a positive video signal and a negative video signal.

FIG. 4 shows a relationship between the positive video signal "a" which is input via the positive data line Di+ and written into the pixel and the negative video signal "b" which is input via the negative data line Di− and written into the pixel, from a black level to a white level. While the positive video signal a has the black level of the lowest gradation at the lowest level, and the white level of the highest gradation at the highest level, the negative video signal b has the white level of the highest gradation at the lowest level and the black level of the lowest gradation at the highest level. The positive video signal a and the negative video signal b have respective polarities opposite to each other and the inversion center thereof is indicated by the reference symbol "c".

Video signal voltages sampled and held in the hold capacitors Cs1 and Cs2 are read out via the source-follower transistors Tr13 and Tr14 each having a high input resistance and selected alternately in a period shorter than a vertical scan period by the switching transistors Tr5 and Tr6 which are turned on by gate signals alternately supplied to wirings S+ and S−, respectively, and the video signal voltages are applied to the pixel electrode PE as drive voltages.

Next, a cross-sectional view and a plan view of a structure for the pixel 10 of the present embodiment will be explained.

Figure 5:
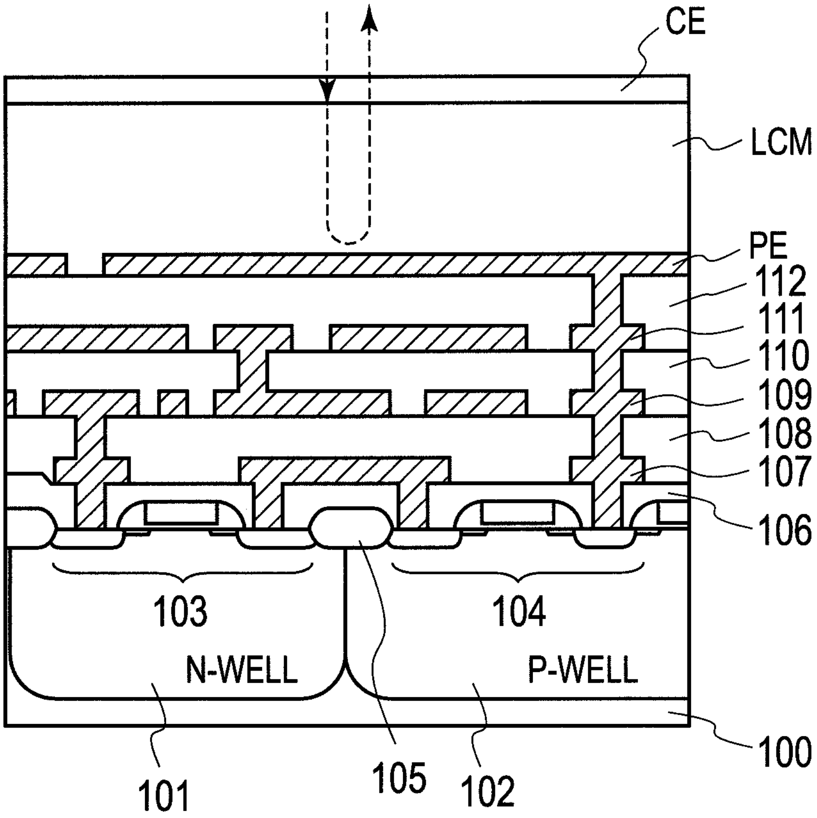
FIG. 5 is a cross-sectional view of a pixel in a liquid crystal display device according to a first embodiment of the present invention.

FIG. 5 shows a cross-sectional view of a pixel in the liquid crystal display device according to the first embodiment of the present invention. In FIG. 5, the same constituent part as that in FIG. 1 is provided with the same reference numeral. In FIG. 5, out of an N-well 101 and a P-well 102 formed in a silicon substrate 100, a source-follower PMOS transistor 103 is formed on the N-well 101 and a switching NMOS transistor 104 is formed on the P-well 102, and these transistors are separated by a field oxide film 105. The source-follower PMOS transistor 103 corresponds to the PMOS transistor Tr13 (or Tr14) in FIG. 3 and the switching NMOS transistor 104 corresponds to the NMOS transistor Tr5 (or Tr6) in FIG. 3.

A source region of the source-follower PMOS transistor 103 and a drain region of the switching NMOS transistor 104 are electrically connected to a first metal 107 which is formed through a first interlayer film 106. Further, a source region of the switching NMOS transistor 104 is electrically connected to a second metal 109 which is formed through a second interlayer film 108, via the first metal 107, and the second metal 109 is electrically connected to a third metal 111 formed through a third interlayer film 110, and further the third metal 111 is electrically connected to a pixel electrode (fourth metal) PE formed on a fourth interlayer film 112. That is, the source region of the switching NMOS transistor 104 is electrically connected to the pixel electrode PE.

The pixel electrode PE is disposed facing a common electrode CE of a transparent electrode apart therefrom. A liquid crystal layer LCM is sandwiched and held between these pixel electrode PE and common electrode CE. Light from a back light which is not shown in the drawing is transmitted through the common electrode CE and the liquid crystal layer LCM, and input to the pixel electrode PE and reflected.

Figure 6:
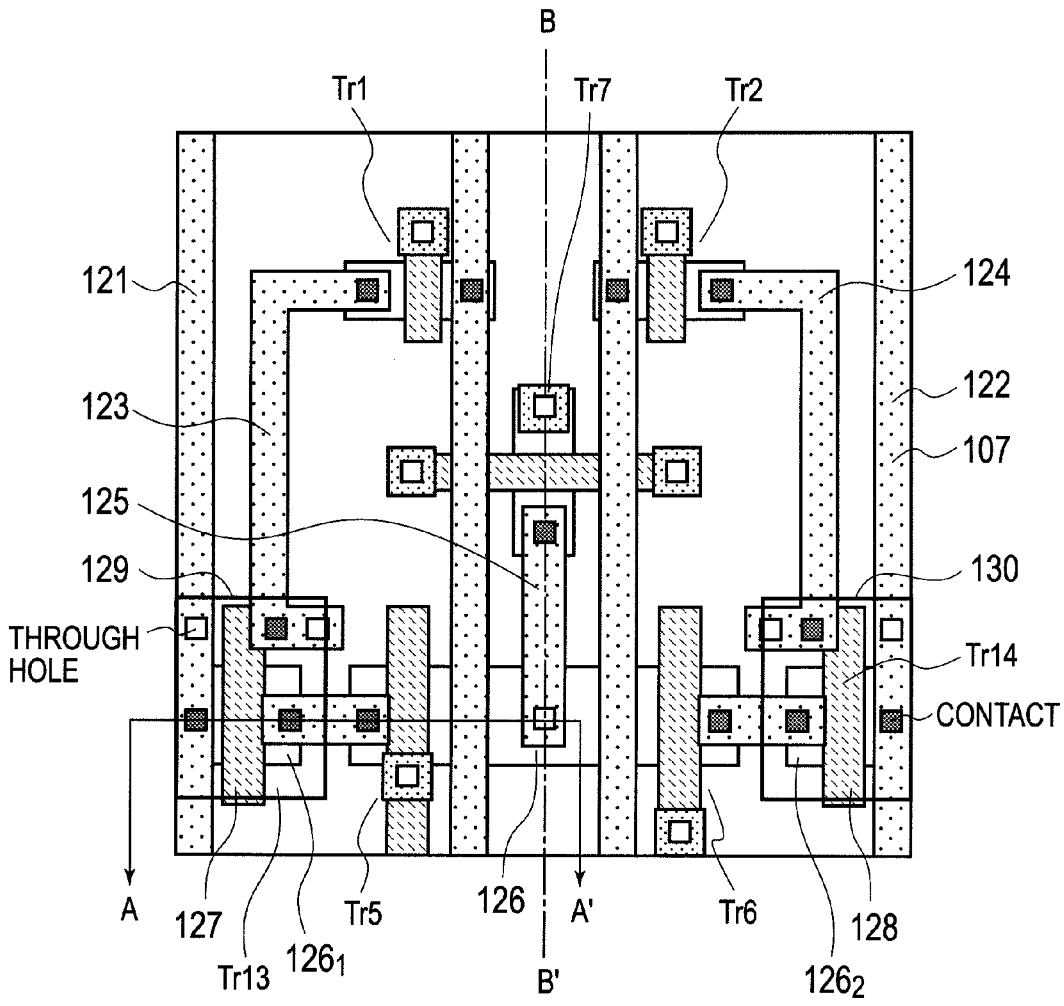
FIG. 6 is a layout plan view of a pixel after through hole processing in a liquid crystal display device according to a first embodiment of the present invention

FIG. 6 shows a layout plan view of a pixel after through hole processing in the liquid crystal display device according to the first embodiment of the present invention. In FIG. 6, the same constituent part as that in FIG. 3 or FIG. 5 is provided with the same reference numeral. In FIG. 6, a cross section along the A-A' line corresponds to the cross section shown in the cross-sectional view of FIG. 5. In FIG. 6, for the first metal 107, circuit constituent elements and wirings pairing with each other, respectively, in a positive signal side circuit part and a negative signal side circuit part within the pixel 10 are configured to be arranged in line symmetry about a hypothetical pixel center line B-B' parallel to the longitudinal direction of the data lines Di+ and Di− (i.e., column direction of a pixel group arranged in a matrix) in the pixel plane.

That is, in FIG. 6, for the wirings in the positive signal side circuit part such as a VDD wiring 121, a Cs1 connection wiring 123, and the like and the wirings in the negative signal side circuit part such as a VDD wiring 122, a Cs2 connection wiring 124, and the like, the corresponding wirings are disposed at positions symmetrical to each other about the pixel center line B-B'. Further, a pixel electrode wiring 125 and the constant current load PMOS transistor Tr7 which are common between the positive signal side circuit part and the negative signal side circuit part are disposed at respective positions on the pixel center line B-B'. Note that, in FIG. 6, a black square indicates a contact and a white square indicates a through hole.

Here, in the present embodiment, in order to change the respective threshold voltages Vth of the source-follower PMOS transistors Tr13 and Tr14 to +0.5 V, respective channel regions of the PMOS transistors Tr13 and Tr14 (overlapping parts between diffusion regions $126_1$ and $126_2$ and poly-silicon regions 127 and 128, respectively) are controlled to cause Vth to become +0.5 V by ion implantation before film deposition for the poly-silicon regions 127 and 128 using a Vth change mask.

Specifically, the above Vth change mask is a mask which includes the respective channel regions of the PMOS transistors Tr13 and Tr14 in FIG. 6 and also is provided with opening parts 129 and 130 each having an area slightly larger than the channel region, and covers a part except the opening parts. Resist patterning is carried out in an exposure apparatus with the use of this Vth change mask, and Vth change ion implantation is carried out in the respective channel regions of the PMOS transistors Tr13 and Tr14. For the other transistors, the Vth change is not performed and therefore the resist becomes a mask to prevent the ions from being implanted. After that, the film deposition of the poly-silicon regions 127 and 128 is carried out and then normal process is carried out. Thereby, Vth can be changed only in the PMOS transistors Tr13 and Tr14.

In this manner, the threshold voltages Vth of the source-follower PMOS transistors Tr13 and Tr14 in this embodiment are set to +0.5 V by the ion implantation in the transistor channel parts, respectively. Note that the above threshold voltage Vth of +0.5 V set for the PMOS transistors Tr13 and Tr14 is obtained when the source voltage is made the same as an N-well voltage and substrate effect is not caused.

Figure 7:
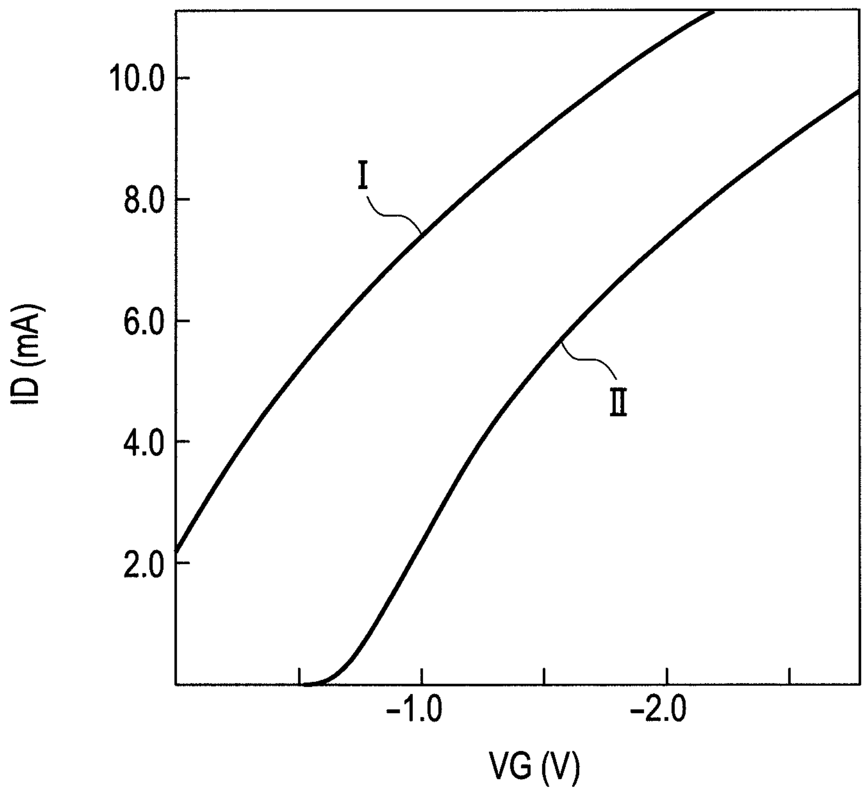
FIG. 7 is a diagram showing respective drain current ID characteristics against gate voltage VG in source-follower transistors comparing a liquid crystal display device according to a first embodiment of the present invention and a conventional liquid crystal display device.

FIG. 7 shows respective drain current ID characteristics against gate voltage VG in source-follower transistors comparing the liquid crystal display device according to the first embodiment of the present invention and the conventional liquid crystal display device. In the liquid crystal display device of the present embodiment, each of the source-follower PMOS transistors TR13 and Tr14 has a threshold voltage Vth set to +0.5 V, and thereby the drain current ID characteristic against the gate voltage VG shows a characteristic of a normally-on transistor in which the path between the source and drain is conductive and drain current ID flows even when the gate voltage VG is turned off, as indicated by the reference numeral I in FIG. 7.

On the other hand, each of the source-follower PMOS transistors Tr3 and Tr4 in the conventional liquid crystal display device shown in FIG. 1 is a normal transistor having a drain current ID characteristic against the gate voltage VG in which the path between the source and drain becomes non-conductive when the gate voltage VG is turned off, as indicated by the reference numeral II in FIG. 7. Further, also each of the switching NMOS transistors Tr5 and Tr6 and the constant current load PMOS transistor Tr7 in the present embodiment is a normal transistor.

Note that each of the source-follower PMOS transistors Tr13 and Tr14 in which the respective threshold voltages Vth are set to +0.5 V is adjusted to have an off-leak current not larger than than 1 μA. Generally, the off-leak current is current flowing between the source and drain when the gate voltage is set to an off voltage (5.5 V in a typical PMOS transistor), and the off-leak current is adjusted in process to have a value of approximately 10 pA. Obviously, a smaller off-leak current is better for a transistor having an improved off-characteristic.

The source-follower PMOS transistors Tr13 and Tr14 in which the respective threshold voltages Vth are set to +0.5 V are turned on normally, and thereby, obviously, are not turned off at a gate voltage of 5.5 V. Accordingly, each of the PMOS source-follower transistors TR13 and Tr14 is set to have an off-leak current not larger than 1 μA when a gate voltage of Vth+1.0V (=1.5 V) is applied on the off-side exceeding VDD.

Obviously, since an actual device treats a signal in a range from GND to VDD, a gate voltage exceeding VDD is not actually applied. The off-leak current when a voltage of VDD+1.5 V (=6.5 V) is applied to the gate of the PMOS transistor is confirmed by a PCM monitor.

Why the off-leak current is required to be not larger than 1 μA will be explained.

Each of the source-follower PMOS transistors TR13 and Tr14 in which the respective threshold voltages Vth are set to +0.5 V is used for a source follower causing a current of 1 μA to flow as a constant current. Since on/off control of the source-follower transistor is controlled by the gate voltage of the constant current transistor, when the PMOS transistor Tr13 or Tr14 has an off-leak current larger than 1 μA, the on/off control of the constant current transistor cannot be performed. That is, even when the constant current transistor is turned on to cause a current of 1 μA to flow, if the PMOS transistor Tr13 or Tr14 has an off-leak current larger than 1 μA, each of the PMOS transistors Tr13 and Tr14 is not turned on and therefore do not perform a function of a source follower. Accordingly, each of the source-follower PMOS transistors Tr13 and Tr14 is adjusted to have an off-leak current not larger than 1 μA (i.e., not larger than the constant current to be caused to flow in each of Tr13 and Tr14).

In each of the source-follower PMOS transistors Tr13 and Tr14 of the present embodiment, as shown in FIG. 3, one end of the hold capacitor Cs1 or Cs2 is connected to the gate electrode and thereby the gate voltage is fixed to a signal voltage held in the hold capacitor Cs1 or Cs2. Accordingly, in the source follower PMOS transistor Tr13 or Tr14, the current between the source and drain is not provided with on/off control by the gate voltage. The on/off control between the source and drain in the source-follower PMOS transistor Tr13 or Tr14 is performed by a gate bias of the constant current load PMOS transistor Tr7 and switching of the switching NMOS transistor Tr5 or Tr6. Accordingly, in the source-follower PMOS transistor Tr13 or Tr14, the resistance value between the source and drain may be controlled by the gate voltage and the current between the source and drain needs not be turned off even when the gate voltage is 5.5 V which is equal to VDD. Thereby, it is possible to avoid using a non-linearity at a high gate voltage of the Tr13 or Tr14.

However, since each of the switching transistors Tr5 and Tr6 is an NMOS transistor, only a voltage not larger than 4.8 V (0 V to 4.8 V) corresponding to the threshold voltage Vth including the substrate effect is output to the drain when VDD is set to 5.5 V, and therefore the input voltage is set to a value not larger than 4.8 V. That is, when VDD is set to 5.5 V and a voltage of 5.5 V is applied as the gate voltage to turn on the switching NMOS transistors Tr5 and Tr6, even if a signal of 0 V to 5.5 V is input to the NMOS transistors Tr5 and Tr6, a range of approximately 0.7 V where the transistor is not turned on is caused by the substrate effect of the Tr5 or Tr6 and therefore only a voltage of 0 V to approximately 4.8 V can be transferred to the drain of Tr5 or Tr6. Accordingly, in the present embodiment, the respective signal ranges of the positive video signal and the negative video signal input through the data lines Di+ and Di− are set to 0 V to approximately 4.8 V. In other words, the linear ranges of the input-output characteristics in the source-follower transistors Tr13 and Tr14 are configured to fall in the output voltage ranges of the switching NMOS transistors Tr5 and Tr6, respectively.

Figure 8:
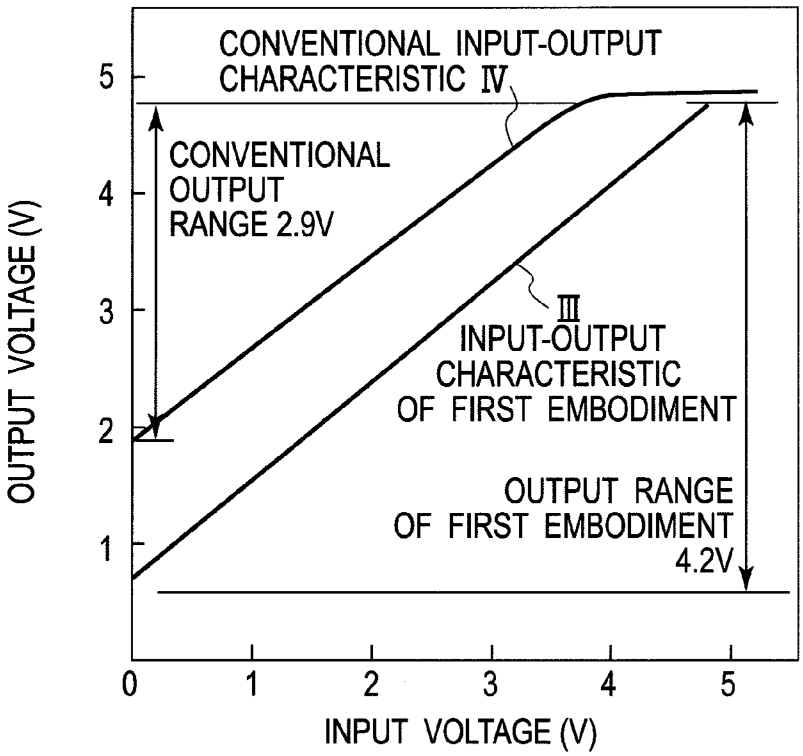
FIG. 8 is a diagram showing pixel output voltage characteristics against pixel input voltage comparing a liquid crystal display device according to a first embodiment of the present invention and a conventional liquid crystal display device.

The reference numeral III in FIG. 8 indicates an output voltage characteristic against input voltage (input-output characteristic) of the liquid crystal display device provided with the pixel 10 according to the present embodiment. In the present embodiment, when the power supply voltage VDD is set to 5.5 V, as indicated by the reference numeral III in FIG. 8, the output voltage to the pixel electrode PE has a linear range of 0.6 V to 4.8 V for the input voltages of 0 V to 4.8 V from the data line Di+ or Di−, and the dynamic range width for the voltage to be applied to the liquid crystal display element LC becomes 4.2 (=4.8−0.6) V and it is possible to expand the dynamic range significantly compared to the conventional range width of 2.9 V indicated by the reference numeral IV in FIG. 8.

Figure 9:
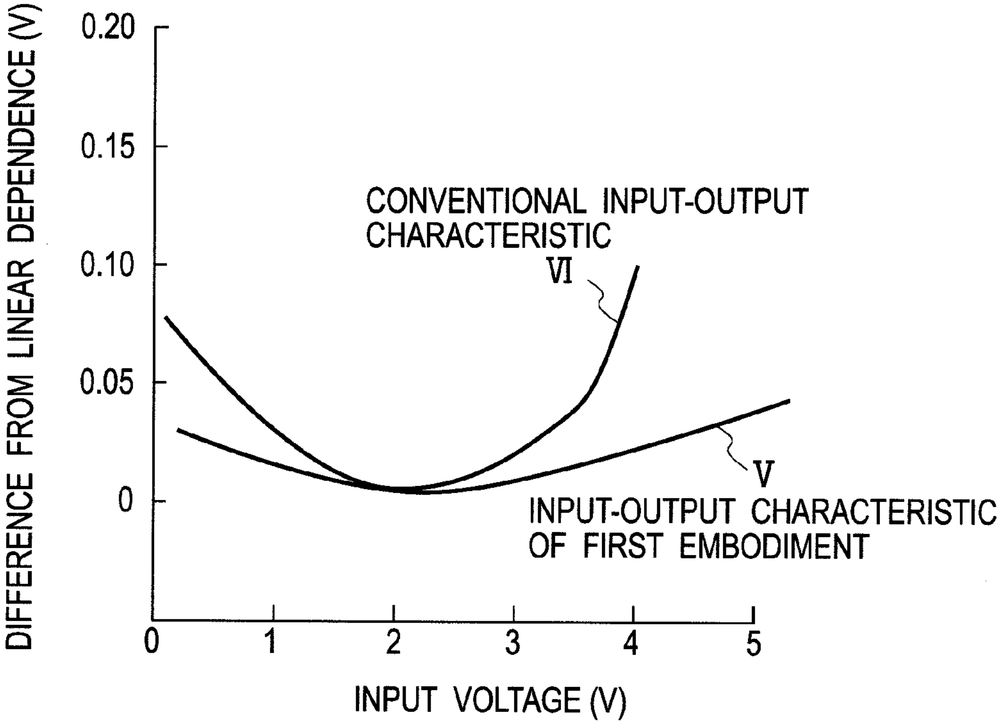
FIG. 9 is a diagram showing respective characteristics of difference from linear dependence in pixel output voltage against pixel input voltage comparing a liquid crystal display device according to a first embodiment of the present invention and a conventional liquid crystal display device.

Further, in the present embodiment, the source-follower PMOS transistors TR13 and Tr14 are configured to have the respective threshold voltages Vth shifted to +0.5 V and to be turned on normally, and thereby linearity is improved. The curve V of FIG. 9 shows difference from linear dependence in the output voltage to the pixel electrode PE against the input voltage in the pixel of the present embodiment. In FIG. 9, it is apparent that the linearity is improved in the characteristic V of the present embodiment compared to the characteristic VI of the difference from linear dependence in the output voltage to the pixel electrode PE against the input voltage in the conventional pixel shown in FIG. 1.

This is because a large substrate effect is caused in an output voltage range for the pixel electrode PE when the threshold voltage Vth is shifted, compared to a case in which the threshold voltage Vth is not shifted. That is, this is because influence of the substrate effect is not constant and, for the case of the normal threshold voltage Vth (=−0.7V), a range having a comparatively small substrate effect is used and therefore a change rate in the influence of the substrate effect is large.

In this manner, in the present embodiment, since the source-follower PMOS transistors Tr13 and Tr14 in the pixel 10 are connected to the respective hold capacitors Cs1 and Cs2 and used always in an on state, only each of the respective threshold voltages Vth in the source-follower PMOS transistors Tr13 and Tr14 is set to a value realizing the normally-on state, current value in each of the source-follower PMOS transistors Tr13 and Tr14 is controlled by the constant current load transistor Tr7, and on/off thereof is controlled by the constant current load transistor Tr7 and the switching NMOS transistors Tr5 or Tr6. Further, in the pixel 10 of the present embodiment, the switching NMOS transistors Tr5 and Tr6 intermediate to limit an output-capable voltage range and thereby it is possible to to perform optimization so as to maximize a range where linearity is secured (dynamic range) by shifting the respective threshold voltages Vth of the source-follower PMOS transistors Tr13 and Tr14.

Second Embodiment

Figure 10:
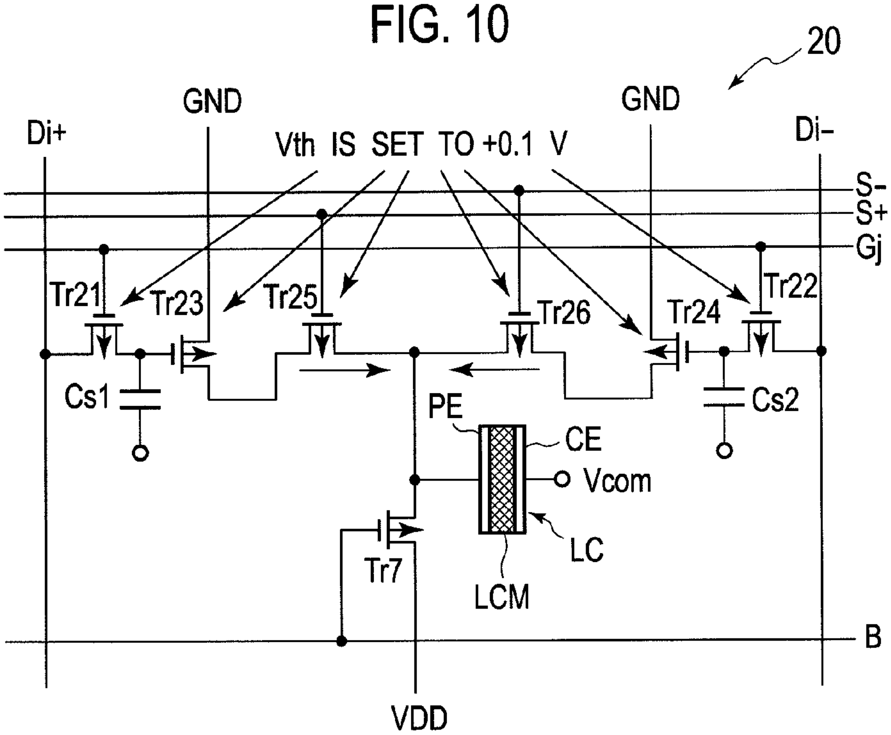
FIG. 10 is an equivalent circuit diagram of a pixel in a liquid crystal display device according to a second embodiment of the present invention.

FIG. 10 shows an equivalent circuit diagram of a pixel in a liquid crystal display device according to a second embodiment of the present invention. In FIG. 10, the same constituent part as that in FIG. 1 is provided with the same reference numeral. While the liquid crystal display device of the present embodiment is a liquid crystal display device in which, the same as in the liquid crystal display device described in Patent document 1, pixels are arranged at respective intersection parts of a plurality of sets of data lines, each set including two data lines (column signal lines) and a plurality of gate lines (row scan lines), a positive video signal and a negative video signal are sampled and held separately in two hold capacitors in each of the pixels, and then held voltages are applied to a pixel electrode alternately to drive a liquid crystal display element in an AC mode, the liquid display device has a pixel configuration different from that of the liquid crystal display device described in Patent document 1 and is configured to have a pixel configuration expressed by the equivalent circuit shown in FIG. 10.

The pixel 20 shown in FIG. 10 is a pixel of the j-th row and the i-th column and provided at an intersection part of a set of two data lines (column signal lines) Di+ and Di− in the i-th column and a gate line (row scan line) in the j-th row, and all the transistors are configured with P-channel MOS transistors. That is, the pixel 20 includes pixel selection PMOS transistors Tr21 and Tr22 for writing a positive video signal and a negative video signal, respectively, source-follower PMOS transistors Tr23 and Tr24, switching PMOS transistors Tr25 and Tr26, and a constant current load PMOS transistor Tr7. Each of the PMOS transistors Tr23 and Tr7, and the PMOS transistors Tr24 and Tr7 configures a so-called source-follower buffer, and accumulated charge in each of the hold capacitors Cs1 and Cs2 is not leaked and held until the signal is written newly after one vertical scan period.

Here, in a case in which all the transistors in the pixel of the conventional liquid crystal display device shown in FIG. 1 are normal PMOS transistors each having a threshold voltage Vth of −0.7 V, when a power supply potential VDD is assumed to be 5.5 V, for example, a PMOS transistor used for a switch can output an input voltage in a range from approximately 1 V to 5.5V, but cannot transfer a low voltage in a range from V to approximately 1 V. Further, the output of the source-follower PMOS transistor has a level shift toward the power supply voltage direction. As a result, the output voltage characteristic against the input voltage in the conventional pixel of FIG. 1 becomes as indicated by the reference numeral VIII in FIG. 13 and an output range width of a linear range becomes narrow as approximately 2.2 V.

Accordingly, in the pixel 20 of the present embodiment, each threshold voltage Vth of the pixel selection PMOS transistors Tr21 and Tr22 for writing the positive and negative pixel signals, respectively, the source-follower PMOS transistors Tr23 and Tr24, and the switching PMOS transistors Tr25 and Tr26 switching the polarity is changed to 0.1 V. Here, the above threshold voltage Vth which is set to 0.1 V in each of the PMOS transistors Tr21 to Tr26 is a threshold voltage of a case in which the source voltage and the well voltage are the same as each other (logic operation) and the substrate effect is not caused. Note that, as described below, each of the PMOS transistors Tr21 to Tr26 is operated by an input voltage of the analog signal and therefore the source voltage is determined separately from the well voltage and the substrate effect is caused. As a result, the threshold voltage Vth varies according to the substrate effect during operation.

By setting the threshold voltage Vth in each of the above PMOS transistors Tr21 to Tr26 to 0.1 V, it becomes possible to cause a low voltage to be transferred through each of the pixel selection PMOS transistors Tr21 and Tr22 for writing the positive and negative pixel signals, respectively, and the switching PMOS transistors Tr25 and Tr26, and thereby it becomes possible to suppress the level shift and to obtain a wider dynamic range in each of the source-follower PMOS transistors Tr23 and Tr24.

On the other hand, each of the pixel selection PMOS transistors Tr21 and Tr22 for writing the positive and negative pixel signals, respectively, and the switching PMOS transistors Tr25 and Tr26 is turned on normally at a normal voltage in a voltage range from GND to VDD and cannot be turned off even when the gate voltage is increased to VDD in a case in which the source voltage is VDD. However, as in the pixel selection PMOS transistors Tr21 and Tr22, in a PMOS transistor switching the positive or negative pixel signal which is an analog signal, the source voltage is determined separately from the well voltage, the threshold voltage Vth varies according to the substrate effect, and the threshold voltage Vth becomes higher (minus direction) as the input voltage becomes lower (GND side).

Accordingly, in the present embodiment, the input voltage for writing the positive or negative pixel signal is set to a low voltage range from 0 V to 4.5 V, and thereby each of the threshold voltages Vth in the pixel selection PMOS transistors Tr21 and Tr22 for writing the positive and negative pixel signals, respectively, is shifted to approximately −0.5 V by the substrate effect and the pixel selection PMOS transistors Tr21 and Tr22 can be turned off when the gate voltage is applied at VDD (=5.5 V). When the input voltage for writing the positive or negative pixel signal is made further lower (GND side), the threshold voltage Vth in each of the pixel selection PMOS transistors Tr21 and Tr22 changes further in the minus direction, and thereby the pixel selection PMOS transistors Tr21 and Tr22 can be turned off even at a low input voltage of 0 V to a voltage lower than 4.5 V.

Next, a cross-sectional view and a plan view of a structure for the pixel 20 of the present embodiment will be explained.

Figure 11:
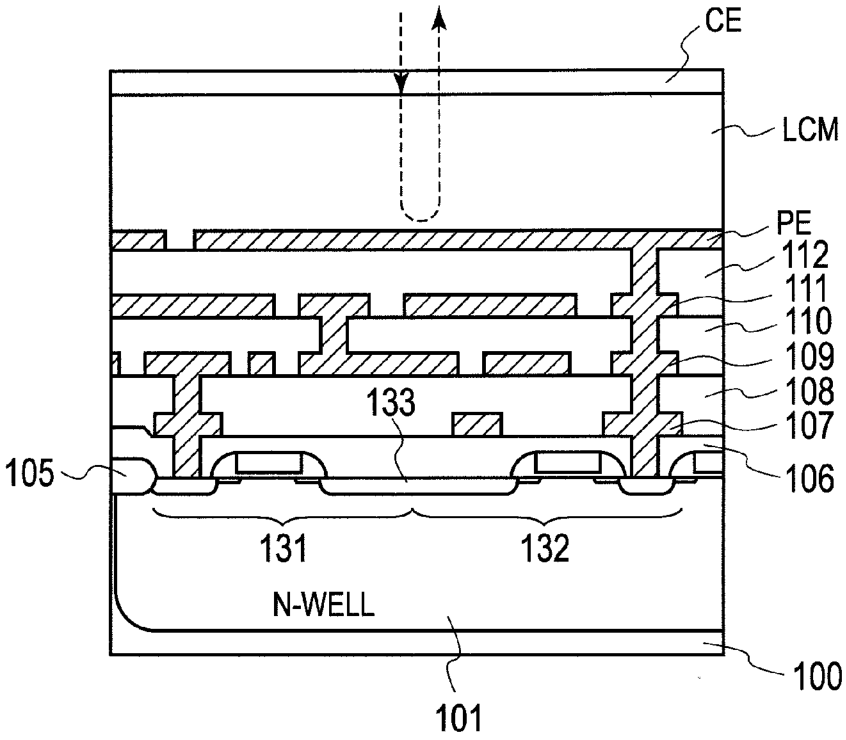
FIG. 11 is a cross-sectional view of a pixel in a liquid crystal display device according to a second embodiment of the present invention.

FIG. 11 shows a cross-sectional view of a pixel in the liquid crystal display device according to the second embodiment of the present invention. In FIG. 11, the same constituent part as that in FIG. 5 or FIG. 10 is provided with the same reference numeral. In FIG. 11, on an N-well 101 formed in a silicon substrate 100, a source-follower PMOS transistor 131 and a switching PMOS transistor 132 are formed neighboring each other. A diffusion layer 133 is used for a source region of a source-follower PMOS transistor 131 and also a drain region of a switching PMOS transistor 132. The source-follower PMOS transistor 131 corresponds to the PMOS transistor Tr23 (or Tr 24) in FIG. 10 and the PMOS transistor 132 corresponds to the PMOS transistor Tr25 (or Tr26) in FIG. 10.

Figure 12:
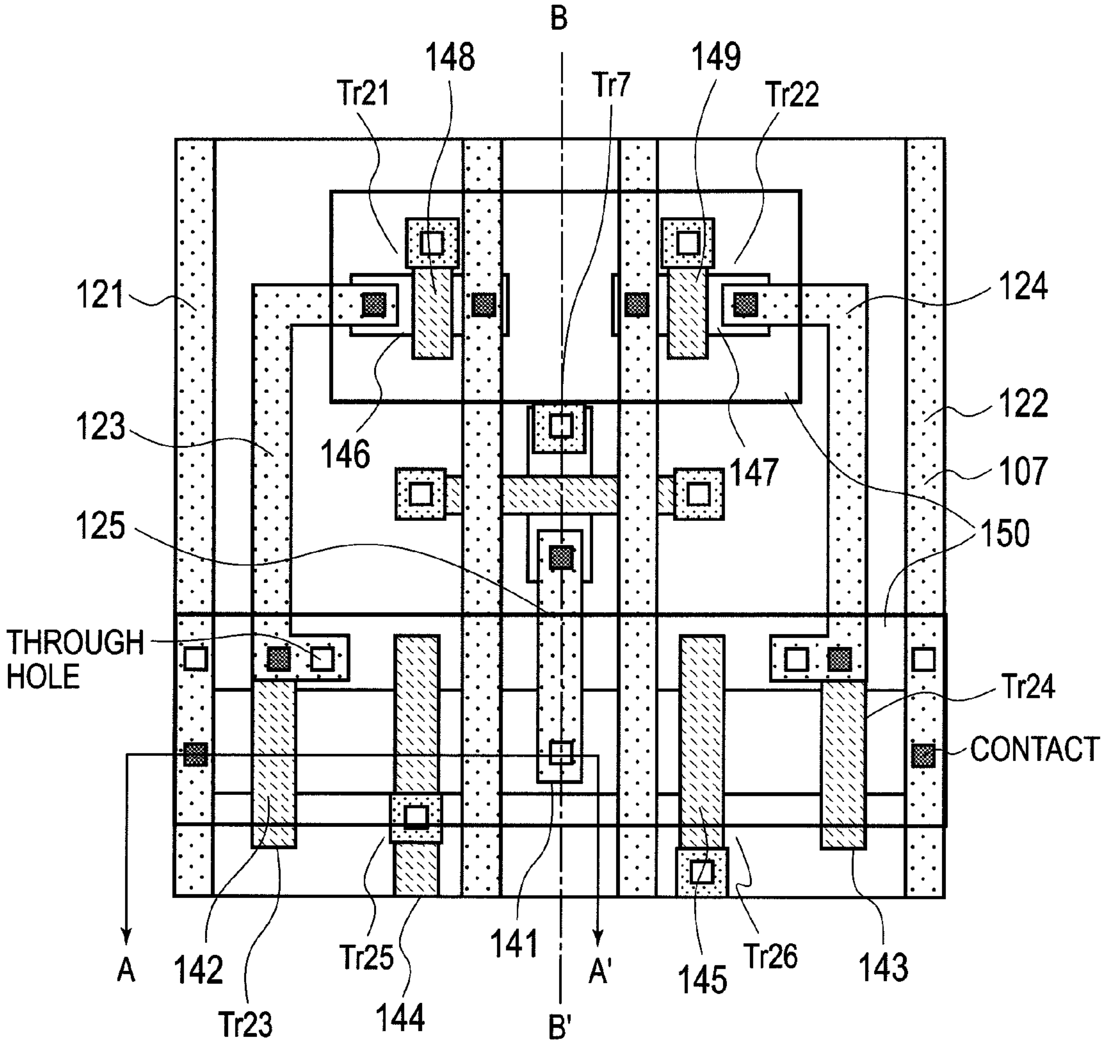
FIG. 12 is a layout plan view of a pixel after through hole processing in a liquid crystal display device according to a second embodiment of the present invention.

FIG. 12 shows a layout plan view of a pixel after through hole processing in the liquid crystal display device according to the second embodiment of the present invention. In FIG. 12, the same constituent part as that in FIG. 6 or FIG. 10 is provided with the same reference numeral. In FIG. 12, a cross section along the A-A' line corresponds to the cross section shown in the cross-sectional view of FIG. 11.

In the present embodiment, in order to set the respective threshold voltages Vth of the PMOS transistors Tr21, Tr22, Tr23, Tr24, Tr25, and Tr26 to +0.1 V, respective channel regions of the PMOS transistors Tr21, Tr22, Tr23, Tr24, Tr25, and Tr26 (overlapping parts between a diffusion region 141 and poly-silicon regions 142, 143, 144, and 145, and overlapping parts between diffusion regions 146 and 147 and poly-silicon regions 148 and 149, respectively, in FIG. 12) are controlled to cause Vth to become +0.1 V by ion implantation before film deposition of the poly-silicon using a Vth change mask.

Specifically, the above Vth change mask is a mask which includes the respective channel regions of the PMOS transistors Tr21, Tr22, Tr23, Tr24, Tr25, and Tr26 (overlapping parts between the diffusion region 141 and the poly-silicon regions 142, 143, 144, and 145, and overlapping parts between the diffusion regions 146 and 147 and the poly-silicon regions 148 and 149, respectively, in FIG. 12) and also is provided with opening parts 150 each having an area slightly larger than the channel region, and covers a part except the opening parts. Resist patterning is carried out in an exposure apparatus with the use of this Vth change mask, Vth change ion implantation is carried out in the respective channel regions of the PMOS transistors Tr21, Tr22, Tr23, Tr24, Tr25, and Tr26. After that, the film deposition for the ply-silicon regions 142, 143, 144, 145, 148, and 149 is carried out and then normal process is carried out. Thereby, Vth can be set to 0.1 V in each of the PMOS transistors Tr21 to Tr26.

Figure 13:
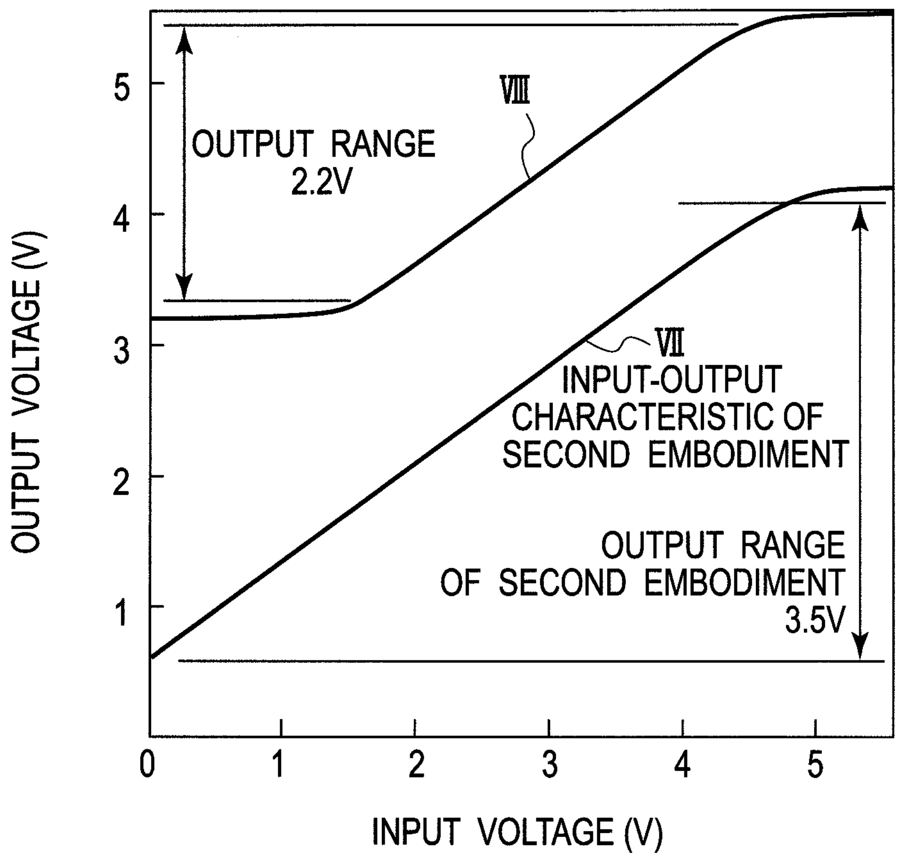
FIG. 13 is a diagram showing pixel output voltage characteristics against pixel input voltage comparing a liquid crystal display device according to a second embodiment of the present invention and a conventional liquid crystal display device.

In the output voltage characteristic against the input voltage in the liquid crystal display device of the present embodiment which is provided with the pixel 20 having the above configuration, when the power supply voltage VDD is set to 5.5 V, as shown by the reference numeral VII in FIG. 13, the output voltage to the pixel electrode PE has a linear range of 0.6 V to 4.1 V for the input voltages of 0 V to 4.5 V from the data line Di+ or Di−, and the dynamic range width for the voltage to be applied to the liquid crystal display element LC becomes 3.5 (=4.1−0.6) V and it is possible to expand the dynamic range significantly compared to the conventional range width of 2.2 V indicated by the reference numeral VIII in FIG. 13.

Note that, while the source-follower PMOS transistors Tr13, Tr14, Tr23, and Tr24 are configured to be turned on normally in the above embodiments, the desired effect of the present invention can be confirmed also in a case in which the transistors are not turned on normally (Vth is shifted to 0 V side), and it is important to adjust a shift amount of Vth so as to maximize the effect. Further, each of the source-follower transistors Tr13, Tr14, Tr23, and Tr24 may be an NMOS transistor. In this case, the threshold voltage of the source-follower transistor is set to be lower than a voltage applied to the source of the constant current load transistor Tr7 and also the gate voltage of the source-follower transistor is set to be lower than the threshold voltage Vth.

What is claimed is:

1. A liquid crystal display device, comprising a plurality of pixels provided at intersection parts where a plurality of sets of data lines each set including two data lines and a plurality of row scan lines intersect each other, each of the pixels, including:

a display element in which a liquid crystal layer is sandwiched between a pixel electrode and a common electrode facing each other;

a first sampling and holding part sampling a positive video signal supplied via one of the two data lines in one set using a first pixel selection transistor to hold the sampled signal in a first hold capacitor for a certain period of time;

a second sampling and holding part sampling a negative video signal which has a polarity opposite to that of the positive video signal and is supplied via the other of the two data lines in one set using a second pixel selection transistor to hold the sampled signal in a second hold capacitor for a certain period of time;

a first source-follower transistor having a gate connected to the first hold capacitor;

a second source-follower transistor having a gate connected to the second hold capacitor;

a first and a second switching transistor which switch a positive hold voltage of the first hold capacitor to be output through a source of the first source-follower transistor and a negative hold voltage of the second hold capacitor to be output through a source of the second source-follower transistor in a period shorter than a vertical scan period and apply the output voltages alternately to the pixel electrode, and also output voltage ranges of which are set so as to include linear ranges of input-output characteristics in the first and second source-follower transistors, respectively; and a constant current load transistor supplying a constant current to the first and second source-follower transistors through the first and second switching transistors, respectively, wherein respective threshold voltages of the first and second source-follower transistors are set by ion implantation so as to be different from a threshold voltage of the constant current load transistor.

2. The liquid crystal display device according to claim 1, wherein each of the first and second source-follower transistors is set in a normally-on state by setting of the respective threshold voltage.

3. The liquid crystal display device according to claim 1, wherein the first and second pixel selection transistors and the first and second switching transistors are N-channel MOS transistors, respectively, and the first and second source-follower transistors and the constant current load transistor are P-channel MOS transistors, respectively.

4. The liquid crystal display device according to claim 1, wherein the first and second pixel selection transistors, the first and second source-follower transistors, the first and second switching transistors, and the constant current load transistor are P-channel MOS transistors, respectively, and respective threshold voltages of the first and second pixel selection transistors and the first and second switching transistors are set to voltages different from a threshold voltage of the constant current load transistor by the ion implantation together with threshold voltages of the first and second source-follower transistors.

5. The liquid crystal display device according to claim 2, wherein, so that leak current in each of the first and second source-follower transistors has a predetermined current value not larger than the constant current supplied from the constant current load transistor, a threshold voltage in each of the first and second source-follower transistors is set to be higher than a voltage applied to a source of the constant current load transistor and also a gate voltage in each of the first and second source follower transistors is set to be higher than the respective threshold voltage when the first and second source follower transistors are P-channel MOS transistors, and a threshold voltage in each of the first and second source-follower transistors is set to be lower than a voltage applied to the source of the constant current load transistor and also the gate voltage in each of the first and second source follower transistors is set to be lower than the respective threshold voltage when the first and second source follower transistors are N-channel MOS transistors.

6. The liquid crystal display device according to claim 4, wherein the threshold voltages of the first and second pixel selection transistors and the first and second switching transistors have the same values as the threshold voltages of the first and second source-follower transistors, respectively.

* * * * *